United States Patent
Venkateshaiah et al.

(10) Patent No.: US 10,997,365 B2
(45) Date of Patent: May 4, 2021

(54) DYNAMICALLY GENERATING A VISUALLY ENHANCED DOCUMENT

(71) Applicant: INTERNATIONAL BUSINESS MACHINES CORPORATION, Armonk, NY (US)

(72) Inventors: Hariprasad Venkateshaiah, Bangalore (IN); Hanson Lieu, Milton Keynes (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/434,434

(22) Filed: Jun. 7, 2019

(65) Prior Publication Data

US 2020/0387566 A1    Dec. 10, 2020

(51) Int. Cl.
| | |
|---|---|
| G06F 40/197 | (2020.01) |
| G06F 40/103 | (2020.01) |
| G06F 40/169 | (2020.01) |
| G06T 3/60 | (2006.01) |
| G06T 5/00 | (2006.01) |
| G06T 3/40 | (2006.01) |

(52) U.S. Cl.
CPC .......... G06F 40/197 (2020.01); G06F 40/103 (2020.01); G06F 40/169 (2020.01); G06T 3/40 (2013.01); G06T 3/60 (2013.01); G06T 5/009 (2013.01); G06T 2207/30176 (2013.01)

(58) Field of Classification Search
CPC .................................................... G06F 40/197
USPC ................................................ 715/229, 230
See application file for complete search history.

(56) References Cited

U.S. PATENT DOCUMENTS

| | | | |
|---|---|---|---|
| 7,769,810 B1* | 8/2010 | Kaufman | G06F 16/176 709/205 |
| 8,749,478 B1* | 6/2014 | Bowen | G09G 5/003 345/107 |
| 8,812,978 B2 | 8/2014 | Eschbach et al. | |
| 9,818,331 B2 | 11/2017 | Ge et al. | |

(Continued)

OTHER PUBLICATIONS

Grace Period Disclosure: Anonymous, "Method and System to store applied visual setting of the 'First Notice of Loss” Document'":, ip.com, IP.Com No. IPCOM000257386D, Feb. 8, 2019, 4 pages.

*Primary Examiner* — Stephen S Hong
*Assistant Examiner* — Broderick C Anderson
(74) *Attorney, Agent, or Firm* — William Hartwell; Andrew D. Wright; Roberts Calderon Safran & Cole, P.C.

(57) ABSTRACT

Systems and methods for generating a visually enhanced image of a digital document are disclosed. In one example, a method includes receiving, by a computing device, a selection of an original document to be viewed by a user; obtaining, by the computing device, visual annotations for the original document from a remote computing device, wherein the visual annotations indicate one or more visual effects parameters associated with one or more pages of the original document; determining, by the computing device, visual effects to be applied to one or more pages of the original document based on the visual annotations; and applying the visual effects to render, by the computing device, a visually enhanced version of the original document for viewing by the user.

20 Claims, 4 Drawing Sheets

(56) References Cited

U.S. PATENT DOCUMENTS

| | | | |
|---|---|---|---|
| 2007/0098297 A1* | 5/2007 | Fushiki | G06T 11/60 |
| | | | 382/276 |
| 2013/0219270 A1* | 8/2013 | Cranfill | G06F 3/0488 |
| | | | 715/269 |
| 2014/0164915 A1 | 6/2014 | Liu et al. | |
| 2018/0053488 A1* | 2/2018 | Hunter | F02D 41/14 |
| 2018/0150978 A1* | 5/2018 | Li | G09G 3/2003 |

* cited by examiner

DYNAMICALLY GENERATING A VISUALLY ENHANCED DOCUMENT

BACKGROUND

The present invention relates generally to digital document viewing and, more particularly, to dynamically generating a visually enhanced image of a digital document.

Various computer program products exist that are configured to present an image or document to a user for viewing via a graphical user interface (GUI). Such products may include viewing tools that enable a user to manually adjust how a document appears to a viewer on a display screen. For example, a Portable Document Format (PDF) viewer may include various tools for adjusting how a PDF document is viewed, such as tools for changing orientation of the document, or zooming in or out of the document.

One type of image document is a First Notice of Loss (FNOL) document. Typically, in an insurance claim process, initial reports are submitted to an Insurance provider regarding a loss, damage, theft, or other injury of an insurance asset, and an FNOL document is generated. FNOL documents may include hand written text that has been converted to digital form, digital photos taken at the location of an incident, a collection of various reports, or combinations thereof. Typically, such documents can be neither recreated, duplicated or modified. In general, insurance flow processes take into consideration even minute information in the FNOL document to generate a decision on an insurance claim. Accordingly, business analysts may make use of content navigation software including a content renderer to render an image of the FNOL document for viewing on a display. The content navigator software may include content visual enhancement tools enabling a user (e.g., business analyst) to manually change display properties of the entire document as a whole, such as brightness, contrast, luminance, hue or gamma properties, to better read or view the content of the document.

SUMMARY

In an aspect of the invention, a computer-implemented method includes: receiving, by a computing device, a selection of an original document to be viewed by a user; obtaining, by the computing device, visual annotations for the original document from a remote computing device, wherein the visual annotations indicate one or more visual effects parameters associated with one or more pages of the original document; determining, by the computing device, visual effects to be applied to one or more pages of the original document based on the visual annotations; and applying the visual effects to render, by the computing device, a visually enhanced version of the original document for viewing by the user.

In another aspect of the invention, there is a computer program product including a computer readable storage medium having program instructions embodied therewith. The program instructions are executable by a computing device to cause the computing device to: receive a selection of an original document to be viewed by a user; determine visual annotations for the original document; determine visual effects to be applied to one or more pages of the original document based on the visual annotations; and render a visually enhanced version of the original document including the visual effects for viewing by the user.

In another aspect of the invention, there is a system including: a processor, a computer readable memory and a computer readable storage medium associated with a computing device; program instructions to receive a selection of an original document to be viewed by a user; program instructions to determine visual annotations for the original document; program instructions to determine visual effects to be applied to one or more pages of the original document based on the visual annotations; and program instructions to render a visually enhanced version of the original document including the visual effects for viewing by the user, wherein the visual appearance of the visually enhanced version of the original document is different from a visual appearance of the original document. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to digital document viewing and, more particularly, to dynamically generating a visually enhanced image of a digital document. In embodiments, a method and system for dynamically applying visual settings for a document is provided. In implementations, a Content Visual Enhancer (CVE) (e.g., a program module stored at a client device or service provider server) stores states (visual effects) such as invert, orientation, zoom, brightness, contrast, luminance, hue or gamma for each page of a document viewed based on one or more visual annotations associated with the document. The term gamma correction or simply gamma refers to a nonlinear operation used to encode and decode luminance or tristimulus values in image systems. In implementations, the CVE utilizes templates of visual effects based on visual annotations associated with the document. The templates of visual effects may be based on a set of rules, such as different document categories (e.g., document type, document name, document creation data, document owner, etc.).

Embodiments of the invention allow for customization of viewing experiences for different groups of documents. In aspects, an Artificial Intelligence (AI) service of the invention or an associated annotation service analyzes a document and automatically generates one or more best-guess visual effect annotations for the document. In embodiments, the AI service or annotation service generates visual annotations for a document dynamically based on metadata of the document. In implementations, the CVE receives information from the viewer (e.g., real-time user information) to determine best visual annotations for the document. In aspects, a document viewer of a client device is configured to send viewer metadata such as location, time, etc. to the CVE, allowing the CVE to pick the best visual effects template for the user based on the viewer metadata.

Various types of digital documents may include content that is visually challenging for a user to read, view or understand. For example, in the case of an insurance document (e.g., First Notice of Loss (FNOL) document) or the like, the document may be in a form that cannot be recreated, duplicated or modified, and may include content that cannot be easily read or clearly viewed in its original state. A reader may utilize visual enhancing tools of a document rendering software (e.g., Portable Document Format (PDF) viewer), such as tools for zooming, changing contrast, etc. However, such software tools must be selected manually by a viewer to apply visual changes to an entire document, and are device dependent. Moreover, the user's manual settings are lost when the user closes the document rendering software. Advantageously, embodiments of the invention enable automatic enhanced visual rendering of each page of a digital document by a CVE based on visual annotations associated with the document. Such annotations may be generated by an AI service of the invention based on an analysis of the document, based on metadata of the document, based on real-time user/viewer data, or combinations thereof.

Accordingly, embodiments of the invention enable the rendering of a document with automatically applied visual effects for improved readability/viewability of content using a CVE. Embodiments of the invention thus provide improvements to the function of computer document rendering tools in the technical field of computer document rendering and displaying, for example. Aspects of the invention utilize unconventional steps of displaying a document with automatic visual effects based on associating annotations and real-time user data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
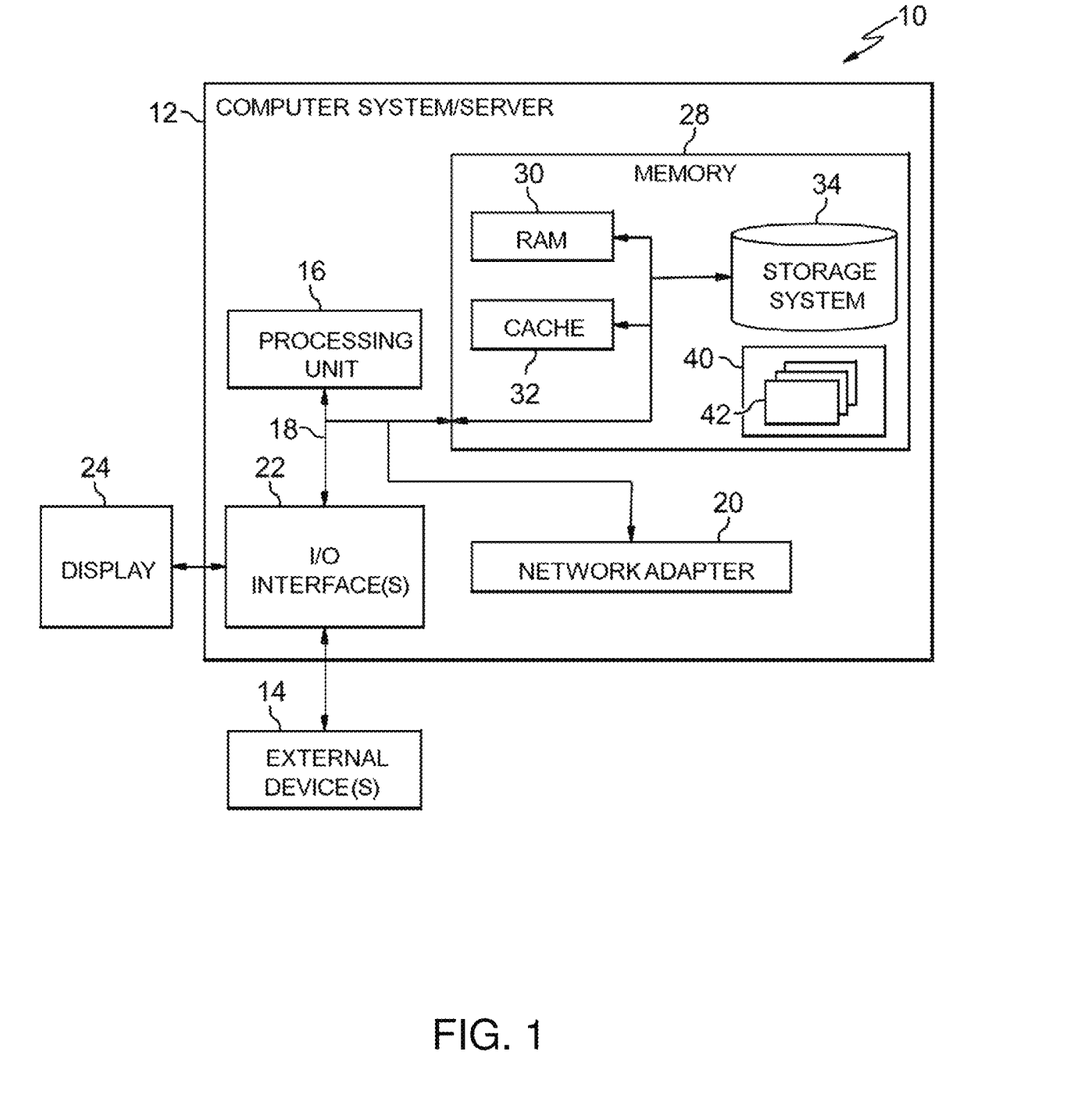
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
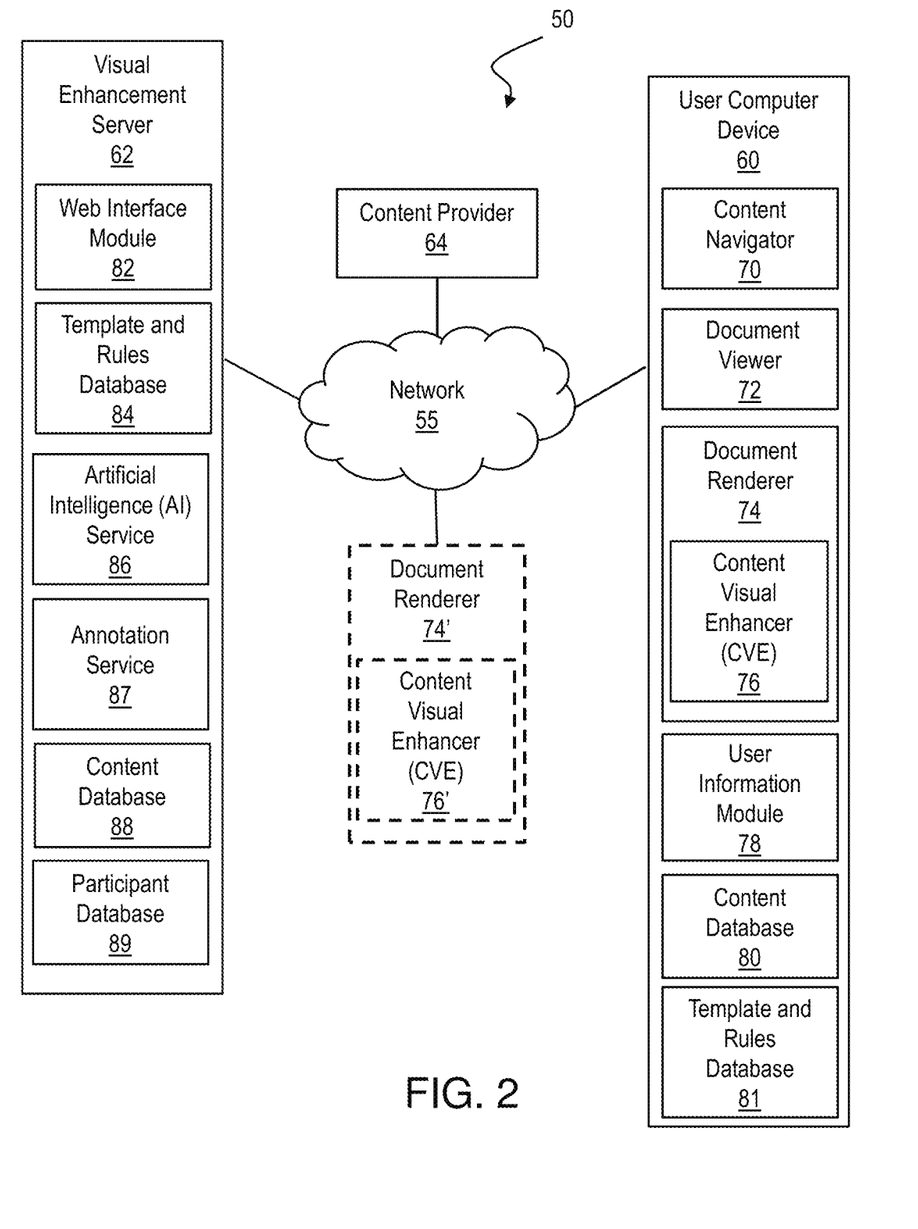
FIG. 2 shows an exemplary environment in accordance with aspects of the invention.

FIG. 2 shows an exemplary environment 50 in accordance with aspects of the invention. The environment includes a network 55 connecting at least one user computer device 60 with a visual enhancement server 62 (hereafter server 62), and optionally, a content provider 64. The user computer device 60 may be in the form of the computing device 12, and may be a desktop computer, laptop computer, tablet computer, smartphone, etc. In implementations, the server 62 is a special purpose-computing device that is part of a visual enhancement service infrastructure for providing document viewing enhancement services to one or more clients (e.g., the user computer device 60 via the network 55). In aspects, the server 62 includes one or more of the elements of the computing device 12 of FIG. 1. The content provider 64 may be any server or database accessible by the user computer device 60 and/or visual enhancement server 62 that includes content to be viewed by a user of the user computer device 60. In one example, the content provider 64 is a server for an insurance company configured to provide FNOL documents to a business analyst for viewing by the user computer device 60.

The network 55 may be any suitable communication network or combination of networks, such as a local area network (LAN), a general wide area network (WAN), and/or a public network (e.g., the Internet). In aspects, the server 62 is a cloud-based server providing document viewing enhancement services for one or more remote user computer devices (e.g., user computer device 60) via the Internet. In alternative embodiments, the server 62 is part of a local infrastructure providing services to clients (e.g., user computer device 60) via a local network.

Still referring to FIG. 2, the user computer device 60 may include one or more program modules (e.g., program module 42 of FIG. 1) executed by the user computer device 60 and configured to perform one or more of the functions described herein. In embodiments, the user computer device 60 includes one or more of the following program modules: a content navigator 70 configured to enable a user to select a document for viewing; a document viewer 72 configured to communicate instructions to cause the document to be rendered for viewing; a document renderer 74 configured to obtain and render a document for viewing; a content Visual Enhancer (CVE) 76 associated with the document renderer 74 and configured to obtain visual annotations associated with the document and to cause the document renderer 74 to apply visual effects to the document during rendering based on the visual annotations; and a user information module 78 configured to provide user information (e.g., real-time location information regarding the user computer device 60) to the CVE 76 for use in determining which visual effects to apply to the document during rendering of the document for viewing. In aspects, the user computer device 60 also includes a content database 80 for storing content such as documents to be viewed by a user via the document viewer 72 of the user computer device 60 and a template and rules database 81 configured to store visual effects templates and rules for the application of visual effects to documents. Although the user computer device 60 is depicted as including the document renderer 74 and CVE 76, in some embodiments these modules are located remote from the user computer device 60 as discussed below with respect to the server 62.

With continued reference to FIG. 2, the server 62 may include one or more program modules (e.g., like program module 42 of FIG. 1) executed by the server 62 and configured to perform one or more of the functions described herein. In embodiments, the server 62 includes one or more of the following program modules: a web interface module 82 configured to enable a user to define rules and/or visual effects templates and store the rules and templates in a template and rules database 84 of the server 62; an artificial intelligence (AI) service 86 configured to determine visual annotations and send the visual annotations to the CVE 76 of the document renderer 74 at the user computer device 60; and an annotation service 87 configured to generate and provide visual annotation data to the AI service 86. In aspects, the server 62 includes a content database 88 configured to store content such as documents to be viewed by a user of the user computer device 60, and/or a participant database 89 configured to store user data such as user identification data; user computer device data; predetermined preferences of the user; data indicative of the state of the user, state of the user's surroundings, or state of the user computer device; or other data relevant to determining best visual effects to be applied to a document to be viewed by the user.

In some embodiments, the document renderer 74 and associated CVE 76 are located remote from the user computer device 60, as indicated by the document renderer 74' and the CVE 76' in FIG. 2. In aspects, the document renderer 74' and the CVE 76' are part of the server 62. In other embodiments, the document renderer 74' and the CVE 76' are in communication with the server 62 directly or via a network connection (e.g., network 55). In implementations, the AI service 86 is configured to determine visual annotations and send the visual annotations to the CVE 76'.

In embodiments, the quantity of devices and/or networks in the environment 50 is not limited to what is shown in FIG. 2. In practice, the environment 50 may include additional devices and/or networks; fewer devices and/or networks; different devices and/or networks; or differently arranged devices and/or networks than illustrated in FIG. 2. In addition, in some implementations, one or more of the devices of the environment 50 may perform one or more functions described as being performed by another one or more of the devices of the environment 50. For example, the annotation service 87 may be part of the AI service 86 or the document renderer 74' or 74. Devices of the environment 50 may interconnect via wired connections, wireless connections, or a combination of wired and wireless connections.

Figure 3:
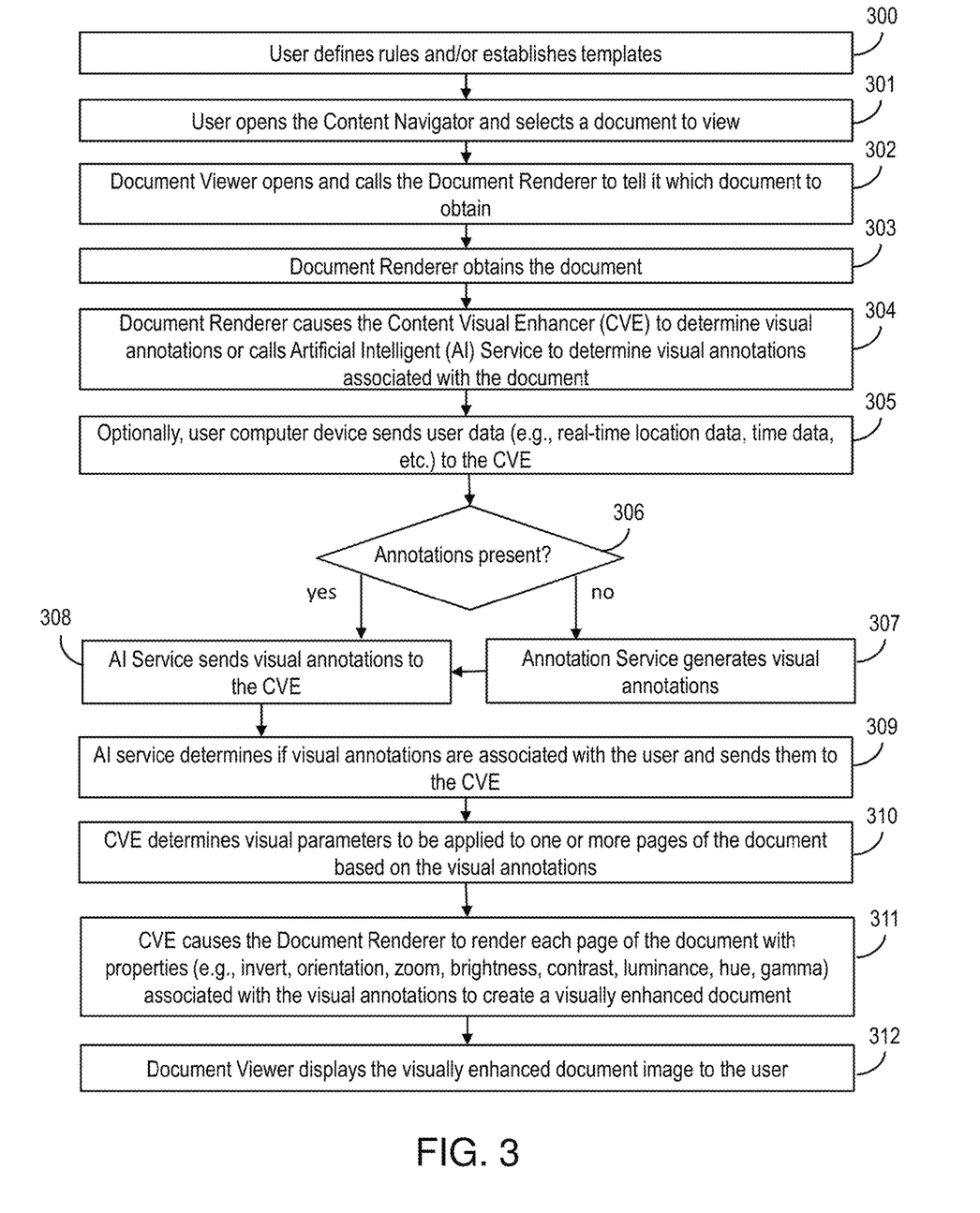
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2 and are described with reference to elements shown in FIG. 2.

At step 300, a user defines rules or visual templates for storage in the template and rules database 81 or the remote template and rules database 84. In implementations, the user enters a user interface portal provided by the web interface module 82 and sets rules and/or defines visual templates at the template and rules database 84 using a graphical user interface (GUI) of the user computer device 60. The term visual template as used herein refers to a template defining one or more predetermined visual effects to be applied to one or more pages of a particular type of document associated with the template. For example, a user may determine that all documents created within a particular date range should have a first visual template applied thereto, wherein the first visual template causes a predetermined resizing of the document to occur at rendering.

In aspects, the web interface module 82 of the server 62 provides options from which a user can choose to set predefined rules regarding which types or categories of documents will be associated with which visual templates. In embodiments, users may choose from one or more of the following visual effects: invert, orientation, zoom, brightness, contrast, luminance, hue or gamma. Predefined categories of documents may be based on document type (PDF, tagged image file format (TIFF), document (DOC), etc.), name pattern (e.g., document title/name), date pattern (e.g., document creation date), document owner, or other attributes. For example, a user may define a template style for all PDF documents created between January 2018 and January 2019 including in the title "Client A", wherein the template sets parameters for orientation, zoom and contrast. In this example, a rule created by the user causes all such PDF documents to be automatically rendered with the predefined orientation, zoom and contrast parameters of the template.

At step 301, a user opens the content navigator 70 of the user computer device 60 and selects a document to be viewed. In aspects, the content navigator 70 accesses a list of available documents remotely (e.g., documents stored at the content provider 64 or in the content database 88 of the server 62) or accesses a list of local documents (e.g., documents stored in the content database 80 of the user computer device 60). In implementations, the user utilizes a GUI of the user computer device 60 to select the document to be viewed. For example, the user may select a First Notice of Loss (FNOL) PDF document stored at the content provider 64 for viewing.

At step 302, upon receiving the user selection at step 301, the content navigator 70 causes the document viewer 72 to open and call the document renderer 74 or 74' to tell the document renderer 74 or 74' which document to obtain based on the user selection. It should be understood that the document viewer 72 may call a local document renderer 74 or a remote document renderer 74', depending on the embodiment in use.

At step 303, the document renderer 74 or 74' obtains the document selected by the user at step 301 based on the call received from the document viewer 72 at step 302. In aspects, a local document renderer 74 obtains the document from local storage (e.g., the content database 80) or remote storage (e.g., the content provider 64 or the content database 88). In alternative embodiments, a remote document renderer 74' obtains the document from its local storage (e.g., the content database 88) or remote storage (e.g., the content provider 64 or the content database 80 of the user computer device 60).

At step 304, the document renderer 74 or 74' causes the associated CVE 76 or 76' to determine visual annotations associated with the document selected at step 301, or causes the CVE 76 or 76' to call the AI service 86 to determine if visual annotations are associated with the document selected at step 301. The term visual annotations as used herein refers to data indicating one or more predetermined visual effects settings or parameters associated with one or more pages of a digital document (PDF, TIFF, DOC, etc.). For example, a multi-page PDF document selected by a user at step 301 may have predetermined visual annotations (visual annotation data) associated therewith indicating different orientation, zoom and contrast settings for each page of the document. The visual annotations may be in the form of visual annotation data stored with a document, or in the form of visual annotations associated with a predefined visual template. In aspects, the CVE 76 or 76' determines if visual annotation data is stored with the document. In implementations, the CVE 76 or 76' determines if one or more predefined visual templates are associated with the document based on predetermined rules (e.g., rules stored in the template and rules database 81). In embodiments, the CVE 76 or 76' determines if predefined visual templates apply to the document based on metadata of the document (e.g., document title, document type, document creation date, document location, user created metadata for the document, etc.) and predetermined rules. For example, the CVE 76 or 76' may determine that a PDF document including metadata indicating a title of "Client A" is associated with a predetermined rule indicating that all PDF documents for Client A should be rendered according to a stored template A in the template and rules database 81.

Optionally, at step 305, the user computer device 60 sends user data (e.g., metadata) to the CVE 76 or 76'. The user data may comprise data (including real-time data) associated with the particular user or the particular user computer device 60. In aspects, real-time user data is indicative of an environment of the user, such as real-time location data, time data, or surroundings data (e.g., ambient light data). The user data may include an identification of the user, predetermined preferences of the user, or data associated with the user computer device 60 (e.g., display size or capabilities). User data may also include third party data related to the user, such as the weather at the location of the user computer device 60. In aspects, the document viewer 72 of the user computer device 60 sends user data in the form of metadata to the CVE 76 or 76', enabling the CVE 76 or 76' to pick the best template for the user based on the metadata. For example, if the user data indicates that the user is on a smartphone outside on a sunny day, the CVE 76 or 76' may make an image of the document brighter. Conversely, if the user data indicates that the user is outside at night, the CVE 76 or 76' may dim the image of the document or make it inverted. If the user data indicates that a display size of the smartphone is small, the CVE 76 or 76' may apply an appropriate zoom level such that text of the document is readable by the user.

At step 306, when the CVE 76 or 76' calls the AI service 86 at step 304, the AI service 86 determines if visual annotations are associated with the document selected by the user at step 301. In aspects, the AI service 86 determines if visual annotation data is stored with the document. In implementations, the AI service 86 determines if one or more predefined visual templates are associated with the document based on predetermined rules (e.g., rules stored in the template and rules database 84). In embodiments, the AI service 86 determines if predefined visual templates apply to the document based on metadata of the document (e.g., document title, document type, document creation date, document location, user created metadata for the document, etc.) and predetermined rules. For example, the AI service 86 may determine that a PDF document including metadata indicating a title of "Client A" is associated with a predetermined rule indicating that all PDF documents for Client A should be rendered according to a stored template A.

At step 307, if the AI service 86 determines that no visual annotations are associated with the document at step 306, the AI service 86 causes the annotation service 87 to generate best-guess visual annotations (visual annotation data) for the document. In aspects, the annotation service 87 performs an analysis of the document to determine document attributes (e.g., document type, document size, contrast, etc.), then determines if visual annotations are associated with those document attributes based on stored rules and/or templates (e.g., rules or templates in the template and rules database 84). Various image analysis techniques may be utilized by the annotation service 87. For example, the annotation service 87 may analyze an image bit map of a document and perform mathematical computations based on the pixels to determine areas of darkness or brightness, contrast between pixels, etc. Based on the determined document attributes (e.g., contrast between groups of pixels), the AI service 86 may determine that annotations associated with a higher contrast level should be applied to a page of the document.

At step 308, if the AI service 86 determines that visual annotations are associated with the document at step 306, or after the annotation service 87 generates the visual annotations at step 307, the AI service 86 returns the visual annotations (visual annotation data) to the CVE 76 or 76'. For example, the AI service 86 obtains visual annotation data generated by the annotation service 87 at step 307 for a PDF document and sends the visual annotation data to the CVE 76 at the user computer device 60. In another example, the AI service 86 obtains the visual annotation data at step 307 for the PDF document and sends the visual annotation data to the CVE 76' remote from the user computer device 60.

At step 309, in embodiments, the AI service 86 determines if visual annotations (visual annotations data) apply to the document based on user data (e.g., user data stored in the participant database 89 and/or real-time user data received at step 305) and sends the determined visual annotations to the CVE 76 or 76'. In aspects, the AI service 86 receives the user data from the CVE 76 or 76'. In implementations, the AI service 86 determines if any predetermined rules or templates are associated with the user or the user computer device 60. In implementations, the AI service 86 looks up predetermined visual effects settings associated with the user and stored in the participation database 89. In one example, a user is associated with a rule indicating that text in documents should be represented at no less than a predetermined size. In another example, the AI service 86 obtains real-time location data from a user, determines that the location data indicates that the user is indoors, and determines that predetermined visual annotations (e.g., a low brightness level of the screen) associated with the user being indoors should be applied based on rules. In another example, the AI service 86 determines that the user computer device 60 is outside on a sunny day based on location data from the user computer device 60 (i.e., real-time data) and associated third party weather data, and based on rules in the template and rules database 84 determines that the image needs to have a high brightness level. Thus, visual annotations associated with the user would include a predetermined brightness level. In a third example, the AI service 86 determines that the user is outside at nighttime based on real-time location and time data, and further determines that the image should be shown inverted based on rules applicable to the time and location data.

In implementations, the AI service 86 determines a first set of visual annotations at step 306 as well as a second set of visual annotations based on user data at step 309 and generates a final set of visual annotations based on the combination of the first set and the second set of visual annotations. This final set of visual annotations is then sent to the CVE 76 or 76' in accordance with steps 308 and 309. In this way, embodiments of the invention generate a custom set of visual annotations for a user based on real-time data, predetermined rules, and document attributes (e.g., metadata). In embodiments, the AI service 86 can override or replace stored templates.

In alternative embodiments, the CVE 76 or 76' determines if visual annotations (visual annotations data) apply to the document based on user data as part of step 304 or step 310. In embodiments, the CVE 76 or 76' determines a first set of visual annotations at step 304 as well as a second set of visual annotations based on user data at step 305 and generates a final set of visual annotations based on the combination of the first set and the second set of visual annotations.

At step 310, the CVE 76 or 76' determines visual parameters to be applied to one or more pages of the document selected at step 301 based on the visual annotations determined by the CVE 76 or 76' or received from the AI service 86. In embodiments, the visual parameters include settings for one or more of the following visual effects: invert, orientation, zoom, brightness, contrast, luminance, hue, and gamma. In implementations, the visual parameters are different from default visual parameters for the original document obtained at step 303. The CVE 76 or 76' may determine visual parameters based on rules stored in the template and rules database 81 of the user computer device 60, or the template and rules database 84 of the server 62, for example.

At step 311, the CVE 76 or 76' causes the associated document renderer 74 or 74' to render a visually enhanced document based on the visual parameters determined at step 310. The term visually enhanced document as used herein refers to a document or an image of a document that is visually different (i.e., has different visual parameters) but not contextually different, when compared to its original version (e.g., stored version). For example, a visually enhanced document may have different inversion, orientation, zoom, brightness, contrast, luminance, and hue or gamma display parameters than the original document selected by the user in accordance with step 301 but contain identical content.

In aspects, the CVE 76 or 76' automatically renders each page of the document with custom visual effects or visual properties (e.g., invert, orientation, zoom, brightness, contrast, luminance, hue, gamma, etc.) based on the visual annotations (i.e., visual annotations data) received from the AI service 86 or determined by the CVE 76 or 76'. In embodiments, the CVE 76 or 76' causes the associated document renderer 74 or 74' to render each page of the document with custom visual effects based on the visual annotations data associated with the document and user data. In embodiments, the document renderer 74 on the user computer device 60 renders the visually enhanced document for display by the document viewer 72. In alternative embodiments the document renderer 74' remote from the user computer device 60 renders the visually enhanced document and is in communication with the document viewer 72 of the user computer device 60 (e.g., via the network 55) to cause the document viewer 72 to display the visually enhanced document to a user via the user computer device 60.

At step 312, the document viewer 72 of the user computer device 60 receives the visually enhanced document from the CVE 76 or 76', and displays it to the user (e.g., via the display 24). The CVE 76 or 76' may save the visually enhanced document in the content database 80. In embodiments, the CVE 76 or 76' can override or replace stored templates with updated templates. In certain embodiments, the document viewer 72 is a conventional document viewer 72, wherein the visually enhanced document automatically generated by the present invention is displayed to the user through the conventional document viewer 72. In such embodiments, users need not rely on manually adjusted visual enhancing tools (e.g., zoom, contrast, etc.) of the conventional document viewer 72 to display a visually desirable rendering of each page of the document selected at step 301. Instead, a visually enhanced document is automatically rendered by the document renderer 74 based on visual annotations (e.g., customized visual annotations) determined by the AI service 86.

Based on the above, it can be understood that embodiments of the invention enable the use of document metadata such as type and name pattern to determine a best visual template to utilize to improve a document's readability. Embodiments of the invention also enable the use of viewer metadata, such as location data and time data, to determine a best visual template to utilize to improve a document's readability. Further, embodiments of the invention enable the use of dynamically computed metadata from a scan of the document to determine a best visual template to be utilized to improve a documents readability.

The method of FIG. 3 can be utilized in a number of different scenarios. In a first example, a business analyst is accessing a business workflow from a hand held computing device (e.g., user computer device 60). In this example, the CVE 76' receives information from the document viewer 72 and determines the best visual annotation to apply to the document to enhance the document based on visual annotation information received from the AI service 86. In this example, the document viewer 72 sends a location of the mobile device, the time, and surrounding information (e.g., the weather) to the CVE 76', allowing the CVE 76' to pick the best template for the user. Further, in this example, the viewer is on a smartphone outside on a sunny day and the CVE 76' makes the image of a selected document brighter. In contrast, if the time indicates that it is nighttime, the CVE 76' may decide to dim the image of the document or make it inverted.

In a second example, a business analyst opens a document to access a business workflow. Based on the document metadata, such as document mime type, document name, creation date, document location, or user created metadata set for the document, the CVE 76 selects a best-fit visual annotation(s) for the document based on stored rules and templates (e.g., rules and templates stored in the user information module 78).

In a third example, a business analyst opens a document to access a business workflow. Based on metadata sent by the document viewer 72 to the CVE 76, such as location, time, viewer size, etc., the CVE 76 selects a best-fit visual annotation for the document.

Based on the above, it should be understood that embodiments of the invention enable the CVE 76 or 76' to utilize template visual effects annotations for document type, e.g. pdf, tiff, or by name pattern or date pattern or by owner etc., allowing for customization of an experience for document groups. The CVE 76 or 76' may override the template for the document or save a new annotation for the individual document. The CVE 76 or 76' may utilize the AI service 86 to scan the document and automatically generate a best-guess visual affect annotation for the document. In implementations, the CVE 76 or 76' can receive information from the viewer to determine the best visual annotation. In aspects, the document viewer 72 can send its location, time, surrounding information to the CVE 76 or 76', allowing the CVE 76 or 76' to pick the best template for the user.

Figure 4:
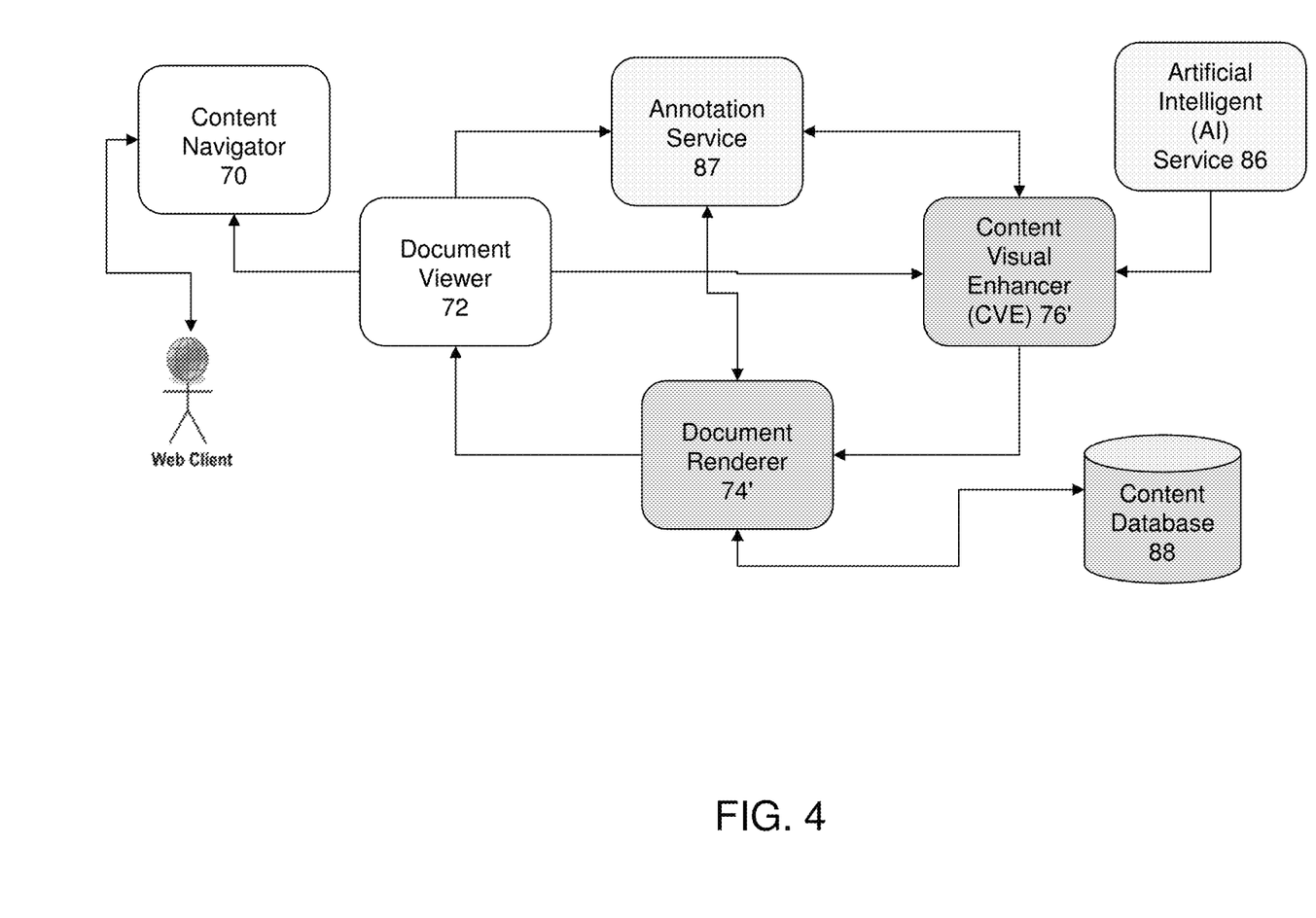
FIG. 4. shows a flow diagram of components of embodiments of the invention.

FIG. 4 shows a flow diagram including components of embodiments of the invention. Components of FIG. 4 may perform method steps of FIG. 3 in the environment illustrated in FIG. 2 and are described with reference to elements shown in FIG. 2.

FIG. 4 will now be referenced in describing an exemplary use scenario wherein a user computer device utilizes the services of a remote cloud-based document renderer 74' and CVE 76'. A user (e.g., a web client) utilizes the content navigator 70 of a user computer device (e.g., user computer device 60 of FIG. 2) to select a document that they would like to view through a document viewer 72 of the user computer device. The content navigator 70 receives the user document selection in accordance with step 301 of FIG. 3 and sends the document request to the document viewer 72, which causes the document viewer 72 to call the document renderer 74' via a network connection (e.g., the network 55) and request that the document renderer 74' obtain the requested document, in accordance with step 302 of FIG. 3. The document renderer 74' obtains the document from a local or remote source in accordance with step 303 of FIG. 3 and causes the CVE 76' to call an AI service 86 to determine if visual annotations are associated with the document in accordance with step 304 of FIG. 3.

In this exemplary scenario, the AI service 86 determines that visual annotations are not associated with the document and causes the annotation service 87 to obtain the document (from the user computer device or another source), analyze the document to determine characteristics of the document, and generate appropriate visual annotations based on rules. See step 307 of FIG. 3. The annotation service 87 sends the generated visual annotations (i.e., visual annotation data) to the AI service 86, which sends the visual annotations to the CVE 76'. The AI service 86 also obtains user data according to step 305 of FIG. 3 and determines that visual annotation data is associated with the user in accordance with step 309 of FIG. 3. Specifically, the AI service 86 determines that the user is outside at night according to real-time location and time data generated by the user computer device 60 and received at the AI service 86, and further determines based on stored rules that the image should be inverted to assist the user in viewing the document, e.g., as described in step 309 of FIG. 3.

The AI service 86 combines the first set of visual annotations generated for the document by the annotation service 87 with the second set of visual annotations (inversion instructions) determined based on user data and generates a final set of visual annotations for the document that is customized for the user. In this scenario, rules stored in the template and rules database 84 determine which visual annotations take precedent over others when there are conflicting visual annotations or rules. The AI service 86 then sends the final set of visual annotations to the CVE 76', which causes the document renderer 74' to render a visually enhanced version of the document in accordance with step 310. The visually enhanced document is then displayed to the user by via the document viewer 72, which obtains the visually enhanced version from the document renderer 74'. See step 311 of FIG. 3. More specifically, the document viewer 72 automatically displays a visually enhanced version of the original document to the user, which includes different visual enhancements for each page of the document. Accordingly, a customized visually enhanced document is presented to the user without the user having to continuously manually adjust visual characteristics when viewing different pages of the document.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for dynamically generating a visually enhanced image of a digital document. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In other embodiments, a system of the invention is configured to provide remote user computer devices with visual annotations for the rendering of visually enhanced documents. In aspects, the system includes: a processor, a computer readable memory and a computer readable storage medium associated with a computing device; program instructions to receive a selection of a document from a remote user computer device of a user; program instructions to determine visual annotations associated with the document wherein the visual annotations indicate one or more visual effects associated with one or more pages of the document; and program instructions to send the visual annotations to the remote user computer device, wherein the visual annotations enable a document viewer of the remote user computer device to generate a visually enhanced document including the visual effects; wherein the program instructions are stored on the computer readable storage medium for execution by the processor via the computer readable memory.

The system may include program instructions to scan the document to determine characteristics of the document, wherein the visual annotations are determined based on the characteristic of the document and stored rules and/or templates. The determining the visual annotations may include determining that metadata of the document matches stored rules, wherein the metadata includes one or more selected from the group consisting of: document mime type, document name, document creation data, document location, and user created metadata.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, by a computing device, a selection of an original multi-page document to be viewed by a user, wherein the original multi-page document is in a state where the original multi-page document is unable to be modified by the user;
    obtaining, by the computing device, visual annotations for the original multi-page document from a remote computing device, wherein the visual annotations are based on metadata of the original multi-page document and predetermined rules and indicate one or more visual effects parameters associated with pages of the original multi-page document;
    obtaining, by the computing device, real-time user data;
    determining, by the computing device, visual effects to be applied to each page of the original multi-page document based on the visual annotations and the real-time user data; and
    rendering, by the computing device applying the visual effects, a visually enhanced version of the original document for viewing by the user, wherein different visual effects are applied to different pages of the original multi-page document.

2. The computer-implemented method of claim 1, wherein the visual effects include one or more selected from the group consisting of: invert, orientation, zoom, brightness, contrast, luminance, hue and gamma.

3. The computer-implemented method of claim 1, wherein the real-time user data comprises predetermined preferences of the user.

4. A computer program product comprising a computer readable storage medium having program instructions embodied therewith, the program instructions executable by a computing device to cause the computing device to:
    receive a selection of an original multi-page document to be viewed by a user;
    determine visual annotations for the original multi-page document, wherein the visual annotations are based on attributes of the original multi-page document and predetermined rules;
    determine visual effects to be applied to each page of the original multi-page document based on the visual annotations and predetermined rules; and
    render a visually enhanced version of the original multi-page document including the visual effects for viewing by the user, wherein different visual effects are applied to different pages of the original multi-page document.

5. The computer program product of claim 4, wherein the determining the visual annotations for the original multi-page document is selected from the group consisting of: matching metadata of the original multi-page document with stored rules or templates; and generating the visual annotations based on an analysis of data of the original multi-page document.

6. The computer program product of claim 4, wherein the determining the visual annotations for the original multi-page document comprises obtaining the visual annotations stored with the original multi-page document.

7. The computer program product of claim 4, wherein the visual effects include one or more selected from the group consisting of: invert, orientation, zoom, brightness, contrast, luminance, hue and gamma.

8. The computer program product of claim 4, wherein the program instructions cause the computing device to obtain user data, wherein the determining the visual effects to be applied to each page of the original multi-page document is based on the visual annotations, the predetermined rules and the user data.

9. The computer program product of claim 8, wherein the user data is indicative of an environment of the user.

10. The computer program product of claim 8, wherein the user data comprises predetermined preferences of the user.

11. The computer program product of claim 4, wherein the original multi-page document is in a state where the original multi-page document is unable to be modified by the user.

12. A system, comprising:
a processor, a computer readable memory and a computer readable storage medium associated with a computing device;
program instructions to receive a selection of an original multi-page document to be viewed by a user;
program instructions to determine visual annotations for each page of the original multi-page document based on attributes of the original multi-page document and predetermined rules;
program instructions to determine visual effects to be applied to each page of the original multi-page document based on the visual annotations and predetermined rules; and
program instructions to render a visually enhanced version of the original multi-page document including the visual effects for viewing by the user, wherein the visual appearance of the visually enhanced version of the original multi-page document is different from a visual appearance of the original multi-page document,
wherein the program instructions are stored on the computer readable storage medium for execution by the processor via the computer readable memory.

13. The system of claim 12, wherein the determining the visual annotations for the original multi-page document is based on matching metadata of the original multi-page document with stored rules or templates.

14. The system of claim 12, wherein the determining the visual annotations for the original multi-page document is selected from the group consisting of: obtaining the visual annotations stored with the original multi-page document; and generating the visual annotations based on an analysis of data of the original multi-page document.

15. The system of claim 12, wherein the visual effects include one or more selected from the group consisting of: invert, orientation, zoom, brightness, contrast, luminance, hue and gamma.

16. The system of claim 12, further comprising program instructions to obtain user data, wherein the determining the visual effects to be applied to each page of the original multi-page document is based on the visual annotations, the predetermined rules and the user data.

17. The system of claim 16, wherein the user data is metadata of the computing device.

18. The system of claim 17, wherein the metadata of the computing device includes one or more selected from the group consisting of location data and time data.

19. The system of claim 12, wherein the rendering the visually enhanced version of the original multi-page document includes applying different visual effects to different pages of the original multi-page document.

20. The system of claim 12, wherein the original multi-page document is in a state where the original multi-page document is unable to be modified by the user.

* * * * *